United States Patent Office 3,031,703
Patented May 1, 1962

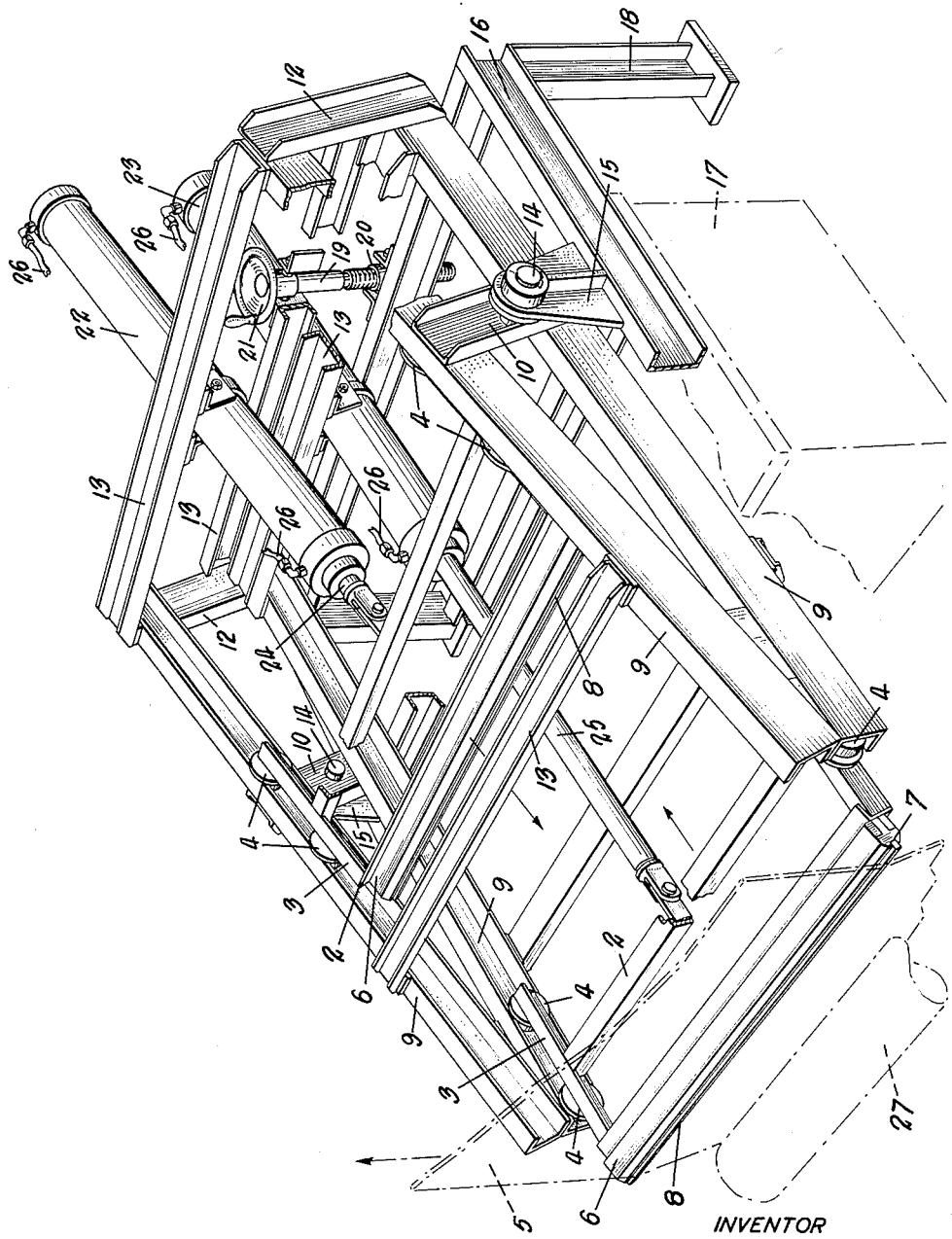

3,031,703
CONTINUOUS STRIP WIPING APPARATUS
Arthur G. Linke, Stoney Creek, Ontario, Canada, assignor to Dominion Foundries and Steel Limited, Hamilton, Ontario, Canada
Filed Mar. 10, 1960, Ser. No. 14,071
7 Claims. (Cl. 15—102)

This invention relates to improvements in continuous strip wiping apparatus of the type embodying a wiping member against which metal strip moves in its passage from a strip coating bath.

The object of this invention is to provide an arrangement having a pair of strip wiping members and so constructed that during periods when one member is in wiping engagement with the moving strip the other member is retracted from strip engagement and vice versa; each wiping member comprising a frame positioned transversely of the strip and mounted for movement towards and away from the strip upon a pair of tracks directed towards the strip.

A further object of the invention is to so arrange the relative positions and directions of the two pairs of tracks that the strip engaging portions of the strip wiping members alternately engage the face of the strip in substantially the same position.

Another object of the invention is to rollably mount the frames of the wiper members upon the tracks and to provide air cylinders and pistons for the actuation of the wiper member frames.

With the foregoing and other objects in view, as shall appear, the invention consists of a continuous strip wiping apparatus constructed and arranged all as hereinafter more particularly described and illustrated in the accompanying drawing, in which:

The FIGURE is a perspective view of the apparatus, its frame being partly broken away.

The two strip wiping members and their frames are of similar size and shape, each comprising a rectangular frame 2 having rearwardly projecting side members 3 upon which pairs of vertical flanged rollers 4 are freely mounted. The forward side of each frame, which is of somewhat greater length than the width of the strip 5 being wiped, extends transversely of the width of the strip and carries a bar 6 extending from end to end thereof and formed with a slot 7 in its forward face for the reception of an asbestos rope wiping pad 8.

The rollers 4 of each frame 2 are mounted within a pair of channel bar tracks 9, the two pairs of tracks being spaced apart at their rear ends and converging at their front ends and retained in assembly by upright side members 10 and 12 and horizontal cross members 13. The convergence of the pairs of tracks 9 is so arranged that the wiping pads 8 when alternately protruding are substantially in the same position when engaging the face of the strip.

The rollers 4 are of a diameter slightly smaller than the distance between the inside faces of the flanges of the channel bar tracks 9 in which they roll and whereby the strip wiping members are restrained against excessive upward thrust under the upward movement of the strip being wiped.

To enable the position of wiping engagement with the upwardly travelling strip 5 to be adjusted in height, the pair of side members 10 of the track assembly are swingably mounted intermediately of their heights upon trunnions pins 14 carried upon a pair of brackets 15 projecting upwardly from a sub frame 16 mounted upon base members 17 and 18, and whereby the track assembly is vertically swingable upon its base. For control of such swinging movement the rear horizontal cross member 13 of the lower pair of tracks carries a depending turnable spindle 19 threaded at its lower end into a block 20 mounted upon the sub frame 16, the upper end of the spindle carrying a hand wheel 21. By rotation of the hand wheel and spindle the front end of the track assembly may be raised or lowered as desired.

For advancement and retraction of the wiper member frames a pair of similar air piston and cylinder assemblies 22 and 23 are mounted upon upper and lower horizontal cross members 13, the piston rod 24 of the upper cylinder 22 being attached to the upper frame 2 and the piston rod 25 of the lower cylinder 23 attached to the lower frame 2. For admittance to and expulsion of air from the cylinders the usual air tubes 26 are provided. It will thus be understood that upon manipulation of control valves (not shown) in the air tubes that either of the wiper members and their frames 2 may be advanced or retracted at will. To retain the upwardly travelling strip 5 in engagement with the protruding wiper a suitably positioned roller 27 bearing against the other face of the strip is provided.

When streaks or poor appearance become noticeable upon the face of the strip being wiped the active wiper is retracted by manual control of its air cylinder and the other wiper advanced to take its place by manual control of its air cylinder. After retraction of one wiper its asbestos rope wiping pad 8 is replaced making it ready for operation when it is desirable to retract the other wiper.

What I claim as my invention is:

1. In an apparatus for wiping vertically moving strip, a pair of members arranged for travel towards and away from the strip, a strip wiping pad carried by each member and extending transversely of the width of the strip, a pair of superposed tracks directed towards the path of movement of the strip and upon each of which one of the two members travel, and power means for propelling the members along the tracks towards the strip and for retracting the members along the tracks away from the strip.

2. An apparatus as defined in claim 1, wherein the members are mounted upon rollers rolling upon the tracks, each track being formed of a pair of channel bars, the rollers resting upon the inside faces of the flanges of the channel bars, the tracks being spaced apart at their rear ends and converging at their front ends in proximity to the path of movement of the strip, the tracks being so directed that the wiping pads upon the moveable members occupy substantially the same location when wiping the strip.

3. An apparatus as defined in claim 1, wherein the members are mounted upon rollers rolling upon the tracks, each track being formed of a pair of channel bars, the rollers resting upon the inside faces of the flanges of the channel bars, the tracks being secured together to form a unit wherein the tracks are spaced apart at their rear ends and converge at their front ends in proximity to the path of movement of the strip, the tracks being so directed that the strip wiping pads upon the movable members occupy substantially the same location when wiping the strip, and a frame upon which said unit is moveably mounted for height adjustment of the location of the pads when wiping the strip.

4. In an apparatus for wiping vertically moving strip, a member arranged for substantially horizontal travel towards and away from the strip, a strip wiping pad carried by the member and extending transversely of the width of the strip, a track having its forward end directed towards the path of movement of the strip and formed of a pair of channel bars, said member being mounted upon rollers resting upon the lower inside faces of the flanges of the channel bars, said rollers being of a diameter slightly smaller than the distance between the upper and lower inside faces of the channel bar flanges, a frame upon which the track is moveably mounted for height adjustment of the strip wiping pad, and power means for propelling the member along the track towards the strip and for retracting the member along the track away from the strip.

5. In an apparatus for wiping vertically moving strip, a member arranged for substantially holizontal travel towards and away from the strip, a strip wiping pad carried by the member and extending transversely of the width of the strip, a track having its forward end directed towards the path of movement of the strip and upon which the member travels, the track being vertically swingable for adjustment of the forward end of the track in height, actuatable track swinging means engaging the track, and power means for propelling the member along the track towards the strip and for retracting the member along the track away from the strip.

6. An apparatus as defined in claim 5, wherein the power means for propelling and retracting the member along the track is a compressed air cylinder having a piston and a piston rod linked to the member, and means for controlling admittance to and expulsion of air from the cylinder.

7. In an apparatus for wiping vertically moving strip, a member arranged for substantially horizontal travel towards and away from the strip, a strip wiping pad carried by the member and extending transversely of the width of the strip, a track having its forward end directed towards the path of movement of the strip and upon which the member travels, means for adjusting the forward end of the track in height, a compressed air cylinder having a piston and piston rod linked to the member for propelling the member along the track towards the strip and for retracting the member along the track away from the strip, and means for controlling admittance to and expulsion of air from the cylinder.

References Cited in the file of this patent
UNITED STATES PATENTS

| | | |
|---|---|---|
| 1,659,984 | Steele | Feb. 21, 1928 |
| 1,740,114 | Painter | Dec. 17, 1929 |
| 1,883,167 | Vickery | Oct. 18, 1932 |
| 2,698,453 | Garrow | Jan. 4, 1955 |
| 2,915,421 | Miller | Dec. 1, 1959 |

FOREIGN PATENTS

| | | |
|---|---|---|
| 767,454 | Great Britain | Feb. 6, 1957 |